US006795435B1

(12) United States Patent
Jouppi et al.

(10) Patent No.: US 6,795,435 B1
(45) Date of Patent: Sep. 21, 2004

(54) METHOD FOR TRANSMITTING DATA TRANSMISSION FLOWS

(75) Inventors: Jarkko Jouppi, Tampere (FI); Juha Kalliokulju, Vesilahti (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/482,845

(22) Filed: Jan. 13, 2000

(30) Foreign Application Priority Data

Jan. 15, 1999 (FI) .................................................. 990075

(51) Int. Cl.$^7$ ............................................. H04L 12/28
(52) U.S. Cl. ..................... 370/394; 370/469; 370/474; 370/476
(58) Field of Search ................................ 370/466, 469, 370/470, 471, 472, 473, 474, 477, 310, 328, 349, 395.4, 395.42, 395.5, 395.52, 464, 465, 394, 395.1, 389, 392, 230, 231, 235

(56) References Cited

U.S. PATENT DOCUMENTS

| 5,461,618 | A | * | 10/1995 | Chen et al. .................. 370/470 |
| 5,574,934 | A | | 11/1996 | Mirashrafi et al. .......... 395/800 |
| 5,717,690 | A | * | 2/1998 | Peirce et al. ................. 370/389 |
| 5,815,516 | A | | 9/1998 | Aaker et al. .................. 371/53 |
| 5,978,386 | A | * | 11/1999 | Hamalainen et al. ....... 370/466 |
| 6,160,808 | A | * | 12/2000 | Maurya ....................... 370/389 |

FOREIGN PATENT DOCUMENTS

| EP | 0684719 | A1 | 11/1995 |
| EP | 0855820 | A2 | 7/1998 |
| EP | 0905998 | A3 | 3/1999 |
| EP | 0917316 | A2 | 5/1999 |
| WO | WO 98/16046 | | 4/1998 |
| WO | WO 98/30060 | | 7/1998 |

OTHER PUBLICATIONS

Bormann, PPP in a real–time oriented HDLC–like framing, Internet Draft, pp. 1–16, Aug. 1998.*
Bormann, The Multi–Class Extension to Multi–Link PPP, Internet Draft, pp. 1–13, Aug. 1998.*
Sklower et al, The PPP Multilink Protocol (MP), RFC 1990, pp. 1–24, Aug. 1996.*
Simpson, PPP in HDLC–like Framing, RFC 1662, pp. 1–25, Jul. 1994.*
Rand, PPP Reliable Transmission, RFC 1663, pp. 1–8, Jul. 1994.*

* cited by examiner

Primary Examiner—Frank Duong
(74) Attorney, Agent, or Firm—Perman & Green, LLP

(57) ABSTRACT

The invention relates to a method for transferring information in data transmission flows between a first (MS) and a second communication device (SH), in which method at least one data transmission connection is established between the first (MS) and the second communication device (SH). The data transmission is divided into at least an application layer (AL), a network layer (NL), and a link layer (LL), wherein packets (502, 505, 508) of the data transmission flow formed in the application layer from the information to be transferred, are modified into network layer packets (509) according to the network layer protocol. The network layer packets (509) are transmitted by means of one or more data transmission channels preferably in link layer (LL) packets (506, 510), to which an information part is established to transfer the information to be transmitted, and at least a first (504) and a second header part (MCML) to transmit identification data on the data transmission flow. In the method, at least one header part (MCML) is transmitted after the information part.

13 Claims, 6 Drawing Sheets

| Flag<br>01111110 | Address<br>11111111 | Control<br>00000011 | Protocol | Information | Padding | Check sum | Flag<br>01111110 |

METHOD FOR TRANSMITTING DATA TRANSMISSION FLOWS

BACKGROUND OF INVENTION

The present invention relates to a method according to the preamble of the appended claim 1 for transmitting data transmission flows preferably in a packet format between communication devices in a communication system comprising at least one data network. The invention also relates to a data transmission system according to the preamble of the appended claim 8, comprising at least a first and a second communication device, and means for activating at least one data transmission connection in order to transfer information between said communication devices. Furthermore, the invention relates to a wireless communication device according to the preamble of the appended claim 12.

In this specification, the term communication device refers for example to such data transmission devices by means of which it is possible to set up a data transmission connection to a data network in order to transmit and receive information. In the data transmission connection, information is transferred between different communication devices. The information to be transferred can include for example files, audio signals, video signals, or combinations of these (multimedia information). In this specification, the term data transmission flow refers to transmission of information related to the same source of information. For example in the transmission of a call, the transfer of an audio signal constitutes one data transmission flow. Correspondingly, to transfer multimedia information which contains audio and video information, advantageously two data transmission flows are thus established.

The data network can be composed of numerous communication devices. At present, for example the Internet data network comprises tens of millions of communication devices. Each communication device has an address which identifies the communication device in the Internet data network. This address information is used to guide different data transmission flows to the correct communication device. Such a data network is composed of routers, which are communication devices capable of routing the received data transmission flows forward. Terminals, in turn, are communication devices capable of transmitting and receiving data transmission flows. In the data network, the data transmission flows transmitted from a transmitting terminal can travel through several routers to the receiving terminal.

The Internet is made to function by determining specific telecommunication standards and protocols, such as TCP (Transfer Control Protocol), UDP (User Datagram Protocol), IP (Internet Protocol) and RTP (Real time Transport Protocol), which are used to control data transmission between numerous parts of the Internet data network. The TCP and the UDP are concerned with preventing and correcting data transmission errors of data transmitted in the Internet data network, the IP is concerned with the structure and routing of the data, and the RTP is designed for real-time data transmission in the Internet data network. The Internet protocol versions used at present are IPv4 and IPv6.

In multimedia applications, for example video image information, audio information and data information is transmitted between a transmitting and a receiving multimedia terminal. The information is transmitted for example by means of the Internet data network or another communication system, such as a general switched telephone network (GSTN). The transmitting multimedia terminal is for example a computer, generally also known as a server, of a company providing multimedia services. The data transmission connection between the transmitting and receiving multimedia terminal is set up in the Internet data network via routers. Information transfer can also be duplex, wherein the same multimedia terminal functions both as a transmitting and a receiving terminal.

The source of information can be advantageously a video application, an audio application, a data application, or a combination of these, all of which will be included within the common term multimedia application in this specification. In a multimedia application, the user of a multimedia terminal selects the location of the desired information source, wherein the system sets up a data transmission connection between the selected retrieval location of the information and the multimedia terminal of the user. In data transmission, data frames are typically used in which the information is transmitted in digital format. Separate data frames are advantageously formed of different types of information sources, and in some cases, information from two or more sources of information may be included in a single data frame. The data frames are transmitted in the communication system to the multimedia terminal of the user. In practical applications, these data frames are temporally interleaved, wherein the actual data transmission flow is composed of temporally separated data frames of various applications. There are also systems under development, in which a separate logical data transmission channel is allocated for different types of applications and in which e.g. different frequencies, or in CDMA-based systems, different code keys are used. In practice, the data transmission capacity of such communication systems is limited e.g. due to the fact that the data transmission channel is physically band restricted, and there may exist several data transmission connections simultaneously, wherein it is not possible to allow any data transmission connection to use the capacity of the entire communication system. In mere audio applications, this does not usually constitute a significant drawback because the amount of information to be transferred is relatively small. However, in the transmission of video information, this restricted band sets great demands for the communication system.

The use of multimedia applications has also been under development in low bit rate communication systems, wherein the data transmission rates are in the order of 64 kbit/s or lower.

FIG. 1a illustrates data transmission between two terminals MS, RH. Correspondingly, FIG. 1b shows the different layers in the protocol stack of the data transmission connection. It is presumed in the example that the information is transmitted via a single router R, but it is obvious that in practice there may be a considerably larger number, even several dozens of routers. The information to be transferred is composed in an application, wherein the term application layer AL will be used for the functions of this layer. In the application layer, the information can be arranged according to a protocol, or it can be in a format recognized by the application. In the transmitting terminal, the information is transferred from the application layer to a lower network layer NL in the protocol stack, or directly to a link layer LL. In the network layer, the information of the application layer is arranged into frames according to any network layer protocol, for example into frames of the Internet protocol (IP). The purpose of the network layer is, for instance, to supplement the frames with routing information. The frames of the network layer protocol are transferred to the link layer, in which the frames are arranged into link layer frames.

These link layer frames are channel coded to enable the actual data transmission between the communication devices. The term physical layer is used for this data transmission layer. The physical layer can comprise wired communication devices, such as a landline telecommunication network, and wireless communication devices, such as a mobile communication network, infrared communication devices, or inductive communication devices. Thus, the data transmission can take place via various data transmission channels. However, between two communication devices one data transmission mode is typically used. In the router, the received information of the physical layer is converted into link layer frames. In some routers, it is possible to route the frames further already on the basis of the information located in the link layer frames. If this is not possible, a conversion to the network layer level is also conducted in the router, wherein the router utilizes the information in the frames of the network layer protocol in order to determine where to transmit the frames further.

For example in an audio application, an analog audio signal is first converted to a digital signal, wherein it is composed of a group of numerical values. In the transmitting terminal, these numerical values are transmitted to the network layer level in the protocol stack in which the information is arranged into frames according to the network layer protocol. These are transferred further to the link layer to form link layer frames and to transfer them via a data network to the receiving terminal. In the receiving terminal, reversed procedures are conducted, i.e. the protocol structure of the link layer is broken up to reconstruct the frames according to the network layer protocol. Correspondingly, in the network layer, the frame structure of the network layer protocol is broken up, wherein in this example the actual information, i.e. the numerical values representing the audio signal, are transferred to the application layer. On the basis of these numerical values, a digital/analog conversion is conducted in the application layer to produce an analog audio signal. Said protocol conversions are advantageously conducted in such a way that they remain invisible to the applications, and thus the applications do not have to be aware of the format in which the information is transferred in the data network.

If information is transferred between two communication devices, the term point-to-point connection can be used for this kind of connection. For such a point-to-point connection, for instance a PPP protocol (Point-to Point Protocol) is developed. The PPP protocol provides a standardized method for transferring data transmission flows according to different protocols between communication devices. Thus, the information to be transferred is framed into frames (packets) according to the PPP protocol, which are transferred in the communication system from a transmitting communication device to a receiving communication device. The information to be transferred can be in a format according to another protocol, for example in IP packets. The PPP protocol typically uses a frame according to an HDLC protocol (High-level Data Link Control). FIG. 2 shows an HDLC type framing of the PPP. The default value of the address field is the binary sequence 11111111, and the default value of the control field is 00000011, which indicate that the data transmission flow in question does not apply validity checking or frame numbering. The protocol field reports the protocol of the information contained in the information field. At the end of the frame, before a flag field, there is a check field FCS (Frame Check Sequence) which is for example a checksum calculated from the packet, such as a 16 bit CRC (Cyclic Redundancy Check). The flag fields are used to separate the beginning and the end of the frame. In practical applications it is common to combine the flag field indicating the end of the frame and the flag field indicating the beginning of the next frame, wherein two successive flag fields are not transmitted.

The PPP protocol is also provided with a format which enhances the reliability of the data transmission: numbered transmission. Thus, each packet is numbered wherein on the basis of this sequential number it is possible to deduce the correct order of the packets in the receiving device and to detect possible missing packets. The receiving device can transmit an acknowledgement and a request for retransmission, if necessary, as is known as such. In the PPP protocol, the numbered transmission mode affects only the content of the address and control fields. In the numbered transmission mode, the value of the address field is set into 1 or 3 in the PPP protocol, if the connection in question utilizes merely a single link, and into 7 or 15, if the connection utilizes a multi-link. It is obvious that the example values used in this specification only function as clarifying, not as restricting examples.

In data transmission according to the PPP protocol, a link control protocol (LCP) is used for setting up, configuring and testing the data transmission connection. Correspondingly, a network control protocol (NCP) is used to set up, configure and test different network layer protocols, such as IP.

In the PPP protocol, a PPP-MP protocol (PPP-multilink protocol) is developed to enable multilink data transmission. Thus, it is possible to transmit the frames of the same data transmission flow by using several different connections, for example on ISDN channels, which accelerates the data transmission in situations when it is possible to allocate several connections for a single data transmission flow. In packets according to this protocol, the protocol field contains information on the fact that they are packets according to the PPP-MP protocol. At the transmission stage these packets are also supplemented with a sequential number, on the basis of which it is possible at the receiving stage to arrange the packets received via various connections into the correct order. This is necessary because the order in which the packets arrive in the receiving terminal is not necessarily the same as the correct order of the packets. This is influenced for instance by the fact that different connections may have different delays. FIG. 3a shows one example of the framing of the PPP-MP packet, and FIG. 3b shows the fragmentation of a network layer protocol packet in the link layer into packets according to the PPP-MP protocol. In this specification, fragmentation refers to the act of dividing packets into smaller fragments. The size of the fragments may vary in different applications. In practice, fragmentation is advantageously conducted in such a way that a network layer protocol packet is framed as a link layer packet, i.e. it is supplemented with header information which advantageously contains data of the network layer protocol used in the packet. If necessary, padding data is provided at the end of the packet in order to attain a packet of desired size. After this the packet is divided into fragments of suitable size, and each fragment is supplemented with a HDLC type framing of the PPP, as well as with an MP header right before a fragment data field. The header of the PPP frame advantageously comprises an address field, a control field and a protocol field. The value of the address field is for example the binary sequence 11111111, the value of the control field is 00000011, and in the protocol field the protocol identification is 00000000-00111101. The MP header field contains a beginning flag, an end flag and a sequence number. The beginning flag is set into value 1 in the first fragment of the transmitting terminal. Correspondingly, the end flag is set into value 1 in the final fragment of the transmitting terminal. If the packet is composed of a single fragment, as for example short audio packets, both the beginning and the end flag are set into the value 1. The sequence number indicates the order of the fragment in the packet. In the PPP-MP protocol, the length of this sequence number field is either 12 or 24 bits.

In radio links, data is typically transferred on a channel which is a particular frequency area. There may be several channels available simultaneously in a single system. Furthermore, full duplex data transmission is provided with separate transmission and receiving channels, wherein for example a base station transmits to a terminal on the transmission channel and the terminal transmits to the base station on the receiving channel. The problem with radio links is that the radio channel is a restricted resource, which limits for instance the bandwidth to be allocated to the radio link, the channel width used in the data transmission, and/or the number of the channels, as well as the data transfer rate available. The radio channel is liable to interference, such as the distortion of the received signal caused by multipath propagation resulting from the fact that the same signal reaches the receiver along different routes at different times. In order to reduce the effect of the interference, part of the data transmission capacity has to be utilized to transmit error correction information with the packets, and it may require several re-transmissions of the packets to attain the desired error probability rate, which reduces the capacity of the radio link.

In such radio links in which several data transmission flows are transmitted on a single channel, the packets of these different data transmission flows are transmitted so that they are interleaved in time. The transmission order can be influenced by prioritizing the packets of different data transmission flows, wherein in a queuing situation, a packet of a higher priority flow is transmitted earlier than a packet of a lower priority flow. These include for example packets of a real-time application, the size of which is also attempted to be made as short as possible. On the other hand, packets of lower priority applications are often considerably longer than packets of higher priority. Such a long packet prevents the transmission of other packets as long as the packet is being transmitted, which may cause significant delays even for the transmission of higher priority packets and impair the service quality, unless there is a method available by means of which the transmission of a long packet can be interrupted when necessary.

In wireless data transmission, problems are also caused by the mobility of the wireless terminal, wherein when the connection of the terminal is changed to another base station, connection to the Internet also has to be set up via this base station. Thus, routing has to be changed as well, if necessary.

In digital mobile phone systems, such as the GSM system, it is possible to transmit messages via a connection oriented connection, such as a circuit-switched connection. An example of such connection oriented connection is a high-speed circuit-switched data connection (HSCSD). Furthermore, it is possible to transmit messages without establishing a circuit-switched connection. Such connectionless message transmission methods include for example the short message service SMS, the unstructured supplementary service data USSD, or the general packet radio service GPRS.

In packet-switched data transmission, information is typically transmitted in bursts, wherein the intervals between the bursts are affected by the amount of information to be transmitted, as well as by the amount of data transmission capacity allocated for the data transmission connection in question. The advantage of such a packet-switched data transmission connection, when compared to the circuit-switched data transmission connection, is for instance that it is not necessary to allocate the data transmission channel reserved for the connection solely for a single data transmission connection, but a number of different data transmission connections can utilize the same data transmission channel. In wireless mobile communication systems, the circuit-switched data transmission connection is typically also implemented in such a way that information of different connections is transmitted in different time slots (logical channels) on the same radio channel. The difference to the packet-switched connection is that even though there was no information to be transmitted in the time slot allocated to the data transmission connection in question, it cannot be utilized in other data transmission connections either. The high-speed circuit-switched data (HSCSD) which is under development for the GSM system, provides two connection types: a transparent connection and a non-transparent connection. In the transparent connection, the mobile communication network allocates resources for the connection in such a way that the connection has a substantially constant data transfer rate, and a constant propagation delay. In the non-transparent connection, the mobile communication network can change the channel coding and the data transfer rate if the situation so requires, wherein, for instance, it is possible to ensure a better error correction capability than in the transparent connection. The circuit-switched connection allocates at least one logical channel for the entire duration of the connection, which can unnecessarily consume the resources of the communication system.

In low bit rate serial data transmission connections, such as the HSCSD, the problem is how to simultaneously transmit non-real time data, such as files, as flawlessly as possible, and real-time data as fast as possible. A working team appointed by the Internet Engineering Task Force (IETF) organization has proposed two real-time packeting solutions for the purpose of minimizing the transmission delays of the real-time packets in a situation where a long data packet is transmitted over a PPP link. In the solution based on the suspend/resume principle, the aim is to transmit a long frame as a whole. Thus, the transmission of the packet is suspended if a higher priority packet is waiting for transmission. The transmission of the suspended packet is resumed after the higher priority packet is transmitted. This solution is applicable in such situations when it is possible to control the packet transmission byte-by-byte both in the transmitting terminal and in the receiving terminal. In the solution of queues of fragments, long packets are always divided in such small fragments that no significant delays occur in the transmission of real-time packets. Each data transmission flow is advantageously provided with a separate transmission queue to which the fragments of the packet are formed. The fragment to be transmitted at a given time is selected from the queue with the highest priority at the moment. This is applicable in situations when it is not possible to interrupt the transmission of a packet already initiated. In the communication system according to this solution, the fragmentation of the packets also when there are no higher priority packets to be transmitted, causes unnecessary delays in the transmission of long packets.

In order to implement the solution of queues of fragments, the IETF has modified the PPP-MP protocol by supplementing the MP header field with a class field. This method is called Multi-Class Extension to the Multi-Link PPP, i.e. MCML. The basic idea of this solution is to transmit several MCML protocol instances with the PPP link, thus creating a method for real-time packeting. FIG. 3c shows an example of the framing of a PPP-MCML packet. By means of this class field, it is possible to indicate the priority of each fragment, on the basis of which it is possible to determine the transmission order of the fragments. Identical sequence numbers may be used in each class, i.e. for example the numbers 0-max. The class field is sufficient for separating the fragments of different classes. In practice, the sequence numbering allocated for the use of different classes may vary in different applications. FIG. 3d shows an example situation where link layer fragments composed of three different data transmission flows are transmitted. For the sake of clarity, only the MCML header information is shown in the figure. Different fragments are separated from each other with thicker vertical lines. In this example, the priority is determined on the basis of the class in such a way that the higher the class the higher the priority. A class 1 data transmission flow is for example the transmission of a non-real time data file, for which a sequence series e.g. in the order of 0 to 999 is determined. A class 2 data transmission flow can be for example the transmission of a video signal, which is attempted to be conducted in as real time as possible so that the video information to be generated at the receiving stage would be as free as possible of interference. The fragments of this class are allocated a sequence series, for example between 0 and 299. A class 3 data transmission flow can be for example the transmission of an audio signal, which requires an even higher real time degree than the video signal. The fragments of class 3 are allocated a sequence series of e.g. from 0 to 99. The value 1 of the beginning flag (B) indicates that the fragment in question is the first one in the fragmented packet. Correspondingly, the value 1 of the end flag (E) indicates that the fragment in question is the last one in the fragmented packet. If both the beginning flag and the end flag have the value 1, it indicates that the fragment contains the entire packet. Packets composed of an audio signal are typically short, and therefore they can often be transmitted in one fragment. This method requires that the size of the fragment to be transmitted is known before the transmission. Thus the transmission cannot be suspended even though a higher priority packet arrived to be transmitted.

However, the above solution has the drawback that the fragmentation of the packets increases the amount of information to be transmitted, because the information has to be supplemented with header information. Thus, the smaller the fragment size, the larger the share of the header information. Furthermore, fragmenting the packets also when there are no higher priority packets to be transmitted, causes unnecessary delays in the data transmission and unnecessary loads in the communication system.

BRIEF SUMMARY OF INVENTION

The objective of the present invention is to enhance packet transmission in such a way that unnecessary fragmentation of the packets can be avoided, nevertheless achieving as small a delay as possible in the transmission of packets requiring real-time data transmission. This invention implements a real-time packeting principle of the suspend/resume type, differing from the real-time packeting already suggested by the IETF. The invention is based on the idea that in link layer packets, part of the header information is transferred to be transmitted in the end of the packet, after the information part contained in the packet. The method according to the present invention is primarily characterized in what will be presented in the characterizing part of the appended claim 1. The communication system according to the present invention is primarily characterized in what will be presented in the characterizing part of the appended claim 8. The wireless communication device according to the invention is primarily characterized in what will be presented in the characterizing part of the appended claim 12.

With the present invention, considerable advantages are achieved when compared with methods and systems of prior art. The method according to the invention enables the transmission of large packets especially in low bit rate serial mode data transmission connections without unnecessary fragmentation, when there are no higher priority packets to be transmitted, and correspondingly ensures a minimum delay for packets requiring real-time transmission. With the method according to the invention, a data transmission connection can be transferred from one mobile communication network to another in such a way that a data transmission connection which meets the requirements as well as possible can be established for each active data transmission flow if it is feasible within the scope of the capacity of the mobile communication network.

In the following, the invention will be described in more detail with reference to the appended drawings, in which:

DETAILED DESCRIPTION OF THE INVENTION

The invention will be described by using as an example a communication system in which information is transferred in packet format between different communication devices MS, RH. The packets can be transmitted by using two or more logical channels. Furthermore, the number of the channels can vary in different communication devices, but with respect to the present invention, it is not significant whether a single or a multilink connection is used in the packet transmission. The communication system used as an example here, advantageously comprises one or more mobile communication networks NW, such as a GSM cellular network, or a UMTS cellular network. As an example of the first communication device RH, a wireless terminal will be used which comprises means e.g. for setting up a packet format data transmission connection to the mobile communication network NW, such as a GSM cellular network. Such a wireless terminal can be composed of a computer, e.g. a portable computer, to which a data transmission device, such as a radio modem, is coupled. In this specification, a situation where information is transferred between the wireless terminal and the mobile communication network NW will be used as an example of a serial data transmission of low transfer rate, but the invention can also be applied in other data transmission connections, for example in Internet connections in a fixed telecommunication network.

Quality of service defines, for instance, how packet data units (PDU) are processed in the data transmission network during the transfer. For example the quality of service determined for the connection addresses is used to control the transmission order, buffering (packet queues) and packet rejection in a support node and in a gateway support node, especially when there are packets to be transmitted in two or more connections simultaneously. Different quality of service levels determine different delays for the packet transfer between different ends of the connection; different bit rates and the number of packets to be rejected can vary in connections with different quality of service.

For each connection it is possible to request a different quality of service. For example in e-mail connections, a relatively long delay can be allowed in the message transmission. However, for example in interactive applications, a fast packet transmission is required. In some applications, such as file transfer, it is important that the packets are transmitted in a nearly flawless manner, wherein packets are retransmitted in error situations, if necessary.

Figure 5:
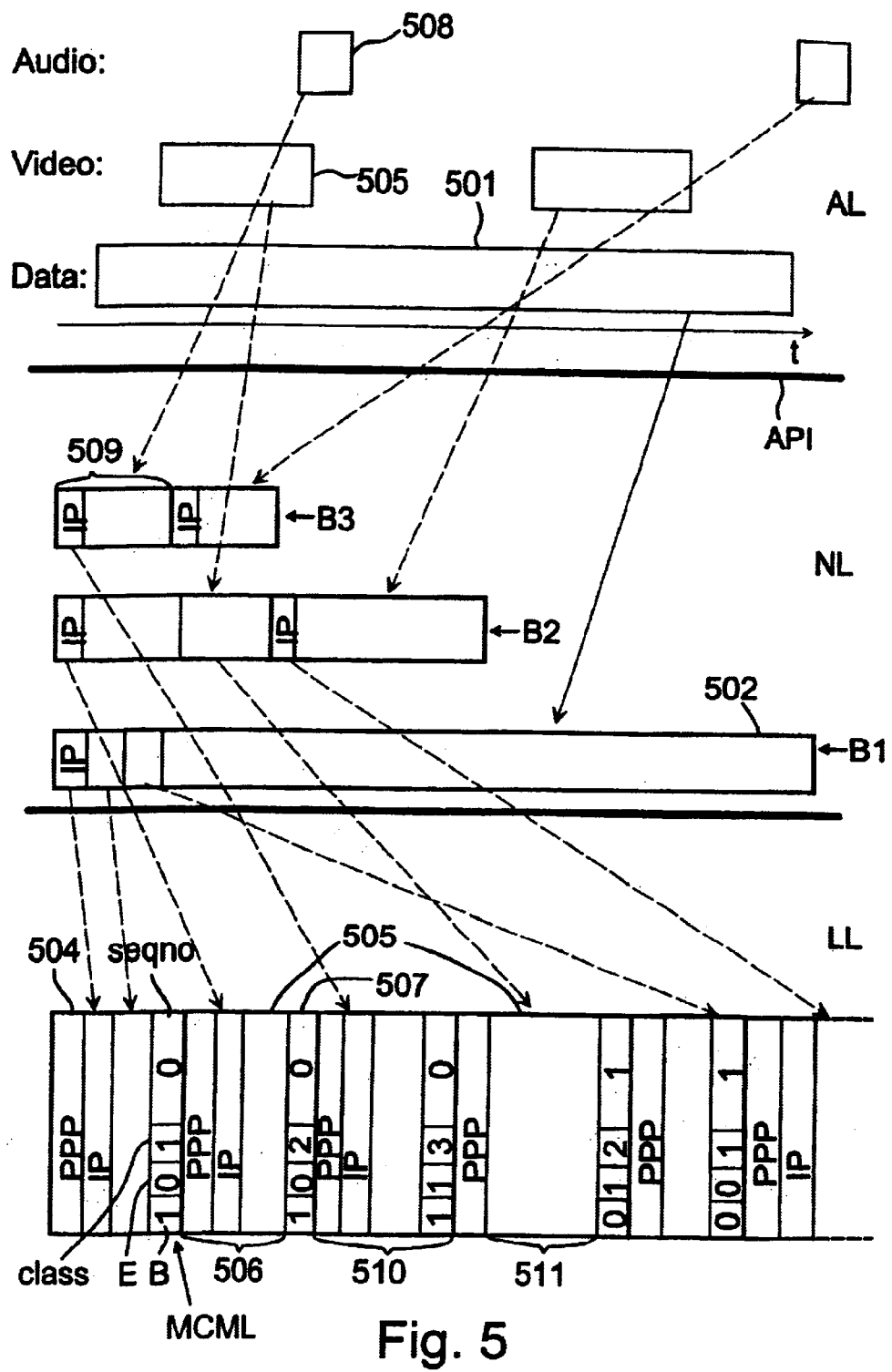
FIG. 5 shows the function of a preferred embodiment of the invention in a reduced manner.

In the following, with reference to the diagram in FIG. 5, a situation will be described where information is transferred in a packet format between a first communication device MS and a second communication device RH advantageously by means of the PPP protocol. At the set-up stage of the data transmission connection, connection set-up signalling has been conducted, e.g. to allocate the necessary resources and to select the connection mode which best corresponds to the quality of service of the connection. In the case of a multi-link connection, it is also possible to allocate several logical channels to be used in the information transmission.

The user of the first communication device MS has, for example, initiated an Internet browser program and proceeded to view the home pages of possibly various service providers in the second communication device RH. The user can, for example, initiate the loading of a file determined on the home page, wherein the communication system activates the data transmission connection for the loading. In this case, the aim is to achieve a data transmission of maximum reliability, but the data transmission does not have to occur in real time. Thus, the communication system sets this data transmission connection into class 1. In the second communication device RH, file transfer is initiated advantageously in such a way that the data transmission application, or the like, active in the second communication device RH, transmits the file to be transferred, illustrated by block 501 in FIG. 5, in one or more sections from the application layer AL to the network layer LN via an application program interface API. In the network layer NL, e.g. file packets 502 according to the Internet protocol are formed of the file by adding for instance IP header information in the beginning of the packets. The file packets 502 are stored to wait for transmission for example in a message buffer established in the memory means (not shown) of the second communication device RH. There may be more than one message buffer, advantageously one for each class. These message buffers B1, B2, B3 are shown in a principle view in the appended FIG. 5. Thus, said file packets formed for file transfer, are transmitted into the class 1 message buffer B1 after the last message in this buffer, or if this message buffer B1 is empty, the packet is transferred in the beginning of the message buffer B1. If this message buffer does not contain enough space for the entire packet, this fact is reported to an upper layer in the protocol stack or the uppermost layer if necessary, in this case the application layer AL. Thus, the application waits until a sufficient amount of capacity for storing the entire packet is deallocated in the message buffer. If there are no other packets to be transmitted, the transmission of this packet is initiated by framing it into a packet according to the protocol used in the link layer.

Figure 1A:
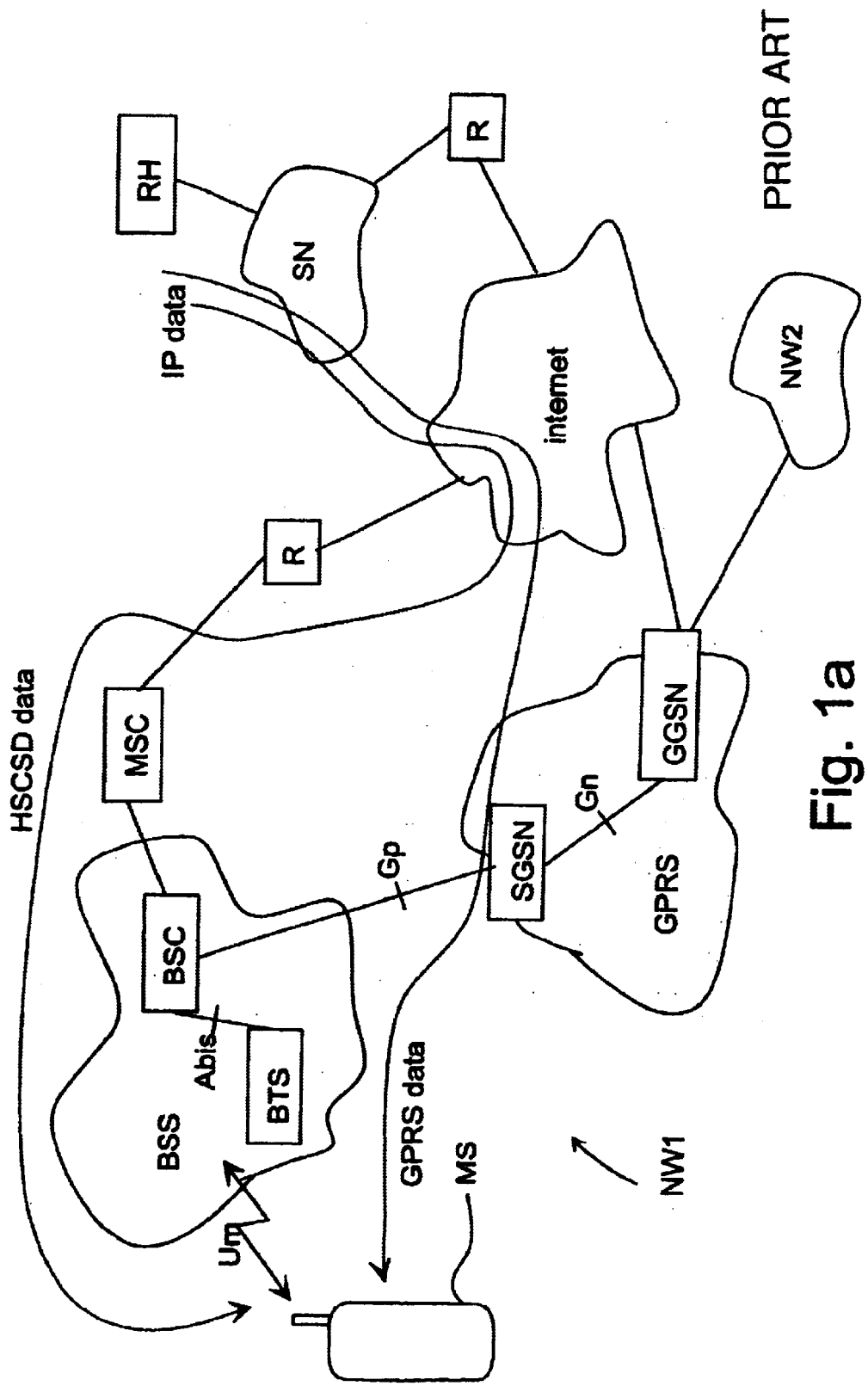
FIG. 1a is a reduced diagram illustrating data transmission between two terminals.
Figure 1B:
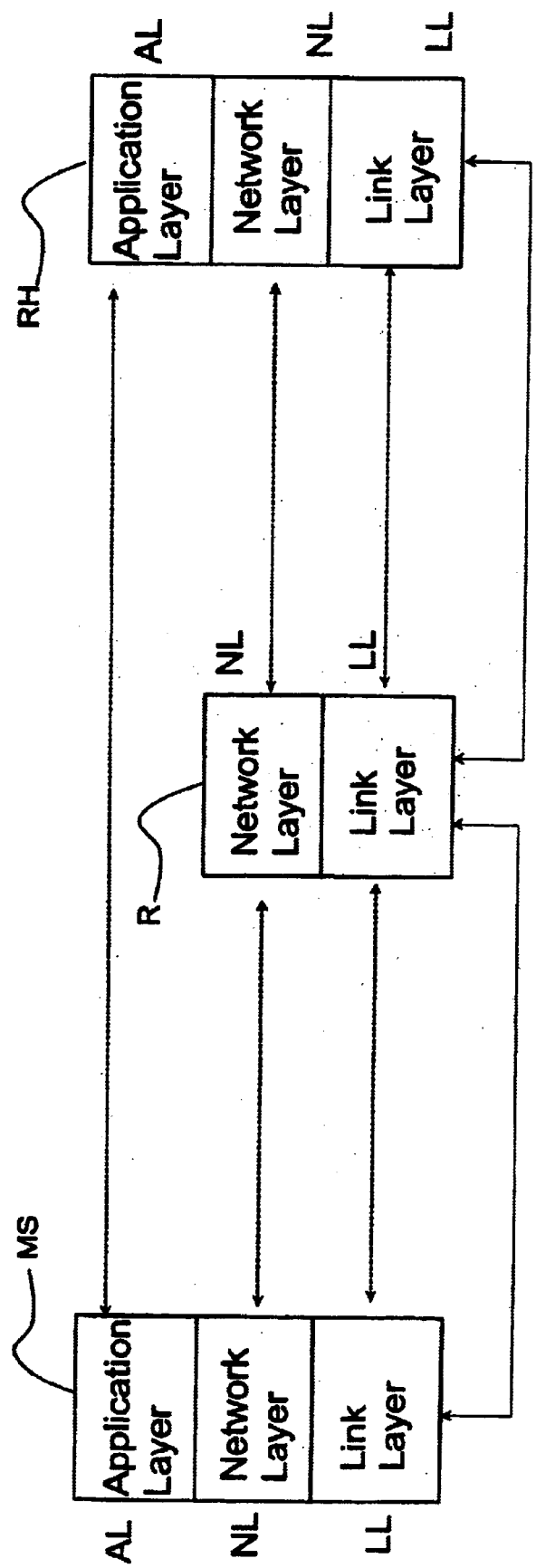
FIG. 1b is a reduced protocol stack diagram illustrating information transmission between two terminals.
Figures 2, 4:
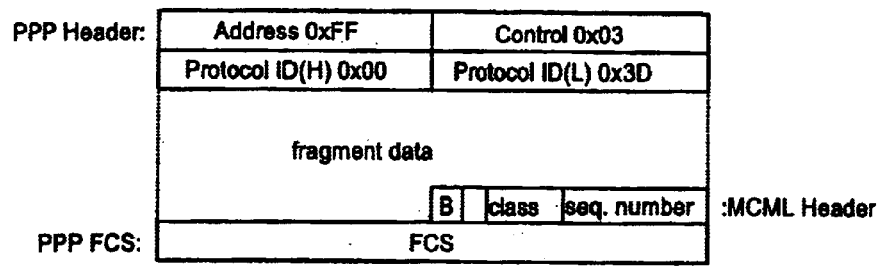
FIG. 2 shows an HDLC type framing of the PPP.
FIG. 4 shows a packet according to a preferred embodiment of the invention.
Figure 3A:
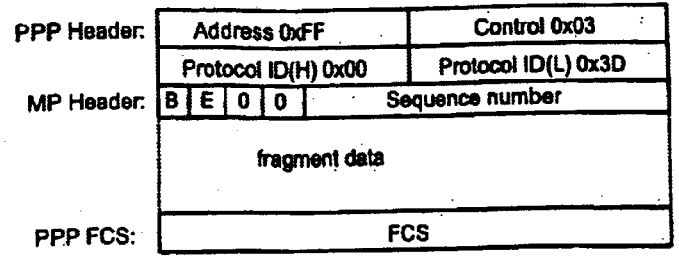
FIG. 3a shows an example of a fragment framing format (with a short 12-bit sequence number) according to the PPP-MP protocol.
Figure 3C:
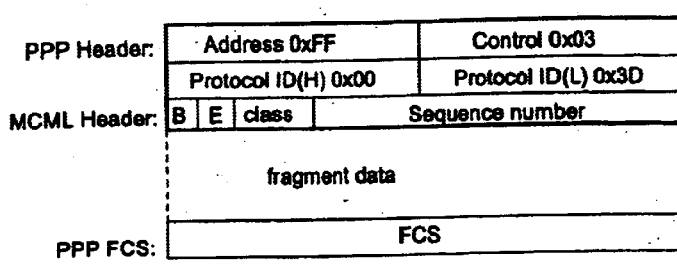
FIG. 3c shows an example of a fragment framing format according to the MCML protocol.
Figure 3D:
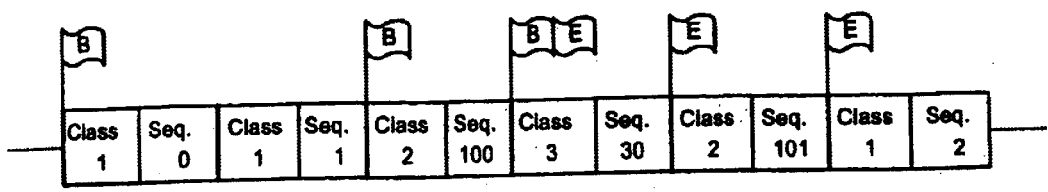
FIG. 3d shows as an example the transmission of link layer fragments by means of the MCML method, the fragments being formed of packets of different data transmission flows.
Figure 3B:
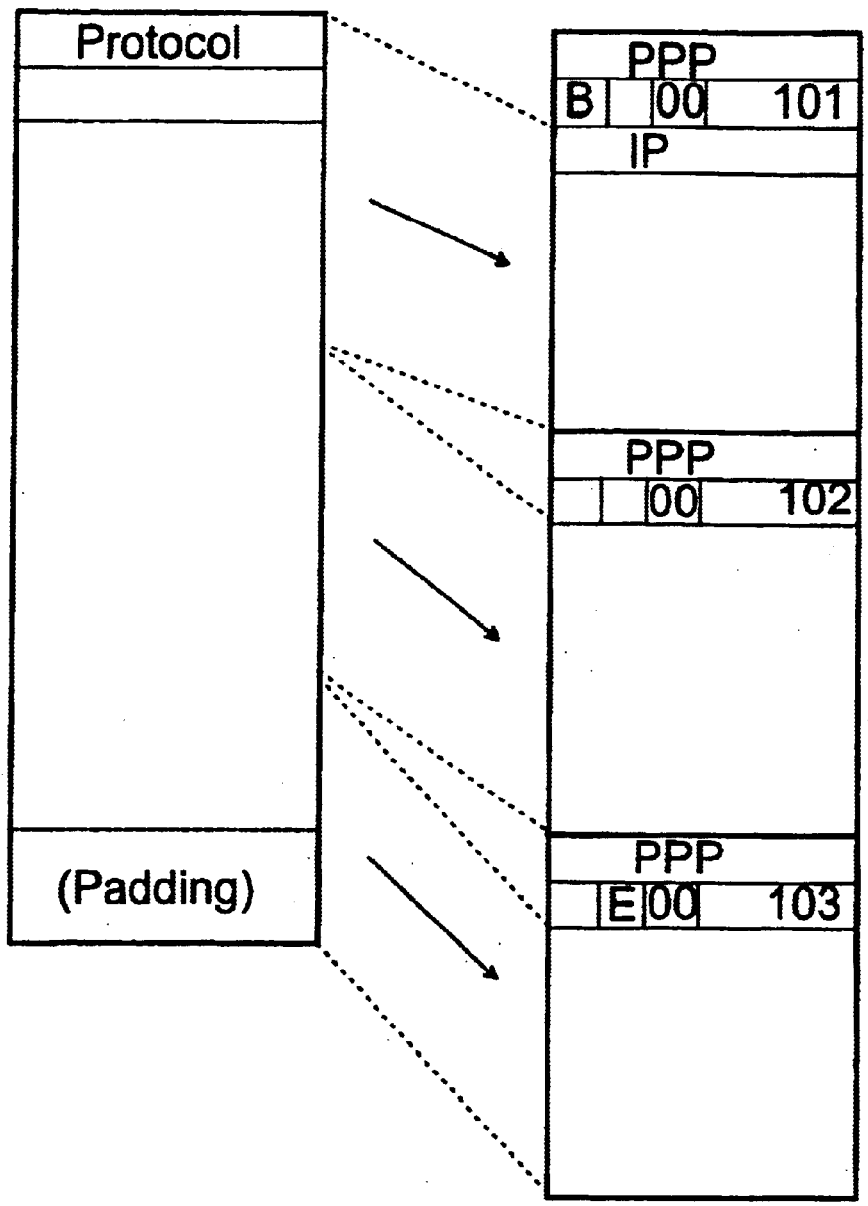
FIG. 3b shows as an example the fragmentation of a network layer protocol packet into PPP-MP packets of the link layer.

FIG. 4 shows a fragment framing according to the present invention, according to which packets formed by different applications can be established. The file packet 502 is framed by supplementing the beginning of the packet in this example with a header 504 according to the PPP protocol. This header contains a header field and a control field, their contents being determined in a way known as such. The header 504 also contains information on the protocol of the packet to be transferred, which in this case is the Internet protocol. In the method according to the present invention, a link layer packet of fixed size is not formed, but the length of the packet is determined dynamically. Thus, the packet is transmitted as a whole in one link layer packet, if no higher priority packets are set to be transmitted. When the entire packet has been transmitted, the end of the packet is supplemented with end fields of the link layer, which in the preferred embodiment of the invention comprise MCML header information and check information. According to the MCML protocol known as such, the header information can be composed of a beginning flag (B), an end flag (E), class information (Class) and a sequence number (Seqno). The check information can be, for example, a 16-bit checksum, such as a CRC checksum. All these fields are not marked in the appended FIG. 5, but reference is made to FIG. 4 in this context.

In the method according to the invention, the size of the sequence number can be reduced especially in data transmission connections using only one logical channel. Thus, the sequence number can be allocated for example four bits in the MCML header information.

The transmission of the packet can be interrupted by the transmission of a higher priority packet. This is illustrated in FIG. 5 by the fragment 505 of the second data transmission flow, which fragment 505 is for example a video packet formed of a video signal. From the application layer, the video packet 505 is transmitted to the network layer NL, in which the packet is framed and stored in the second message buffer B2. At this stage, the MCML header information of the file packet to be suspended is transmitted: advantageously the beginning flag (B), the end flag (E), class information (Class), and the sequence number (Seqno). If the fragment in question was the first fragment formed of the file packet, as in the example of FIG. 5, the B-flag is set into value 1, and in other cases into value 0. If the whole packet was transmitted, the E flag is set into value 1, in other cases into value 0. In this example, the class information is 1. The sequence number is advantageously set into a numerical value which is one unit larger than the value of the previous transmission related to the same packet, or the sequence number is set into zero if the counter overflows. If, however, the fragment in question was the first part of the packet, the sequence number can be set into a first sequence number area (for example zero) allocated for the class in question, or it is possible to proceed with the numbering without resetting the counter after transmitting the previous packet, wherein the sequence number counter utilizes the entire sequence number space for each class.

Before the next link layer packet can be transmitted, checksum information on the suspended frame is transmitted, for example a 16-bit CRC sum, and a flag of the fragment. The sum information and the flag are not marked in the appended FIG. 5.

The transmission of the video packet 505 is conducted in a corresponding way by framing it into a packet 506 according to the link layer. This video information is set into the class 2. In the present example, this packet 506 starts the transmission of the video packet 505, but the transmission is suspended when a packet of even higher priority is set to be transmitted. Thus, MCML header information is produced, in which the B-flag is set and the sequence number is advantageously the first value (0) in the sequence number series allocated for the second class. This sequence number is marked with the reference number 507 in FIG. 5. Furthermore, a checksum is calculated and transmitted together with the flag of the frame.

The transmission of the video packet 505 is suspended by a packet 508, which is for example a packet formed of an audio signal in a multimedia application. This packet is advantageously framed into a packet 509 according to the protocol used in the network layer, the packet 509 being framed at the transmission stage into a packet 510 according to the link layer. In this case, the entire audio packet 509 is transmitted in one fragment, because higher priority packets are not set to be transmitted during the transmission of this audio packet 509. Thus, after the transmission of the entire packet 509, the MCML header is also transmitted according to the link layer protocol, as presented above in connection with the transmission of file and video packets. Now, however, both the B-flag and the E-flag are set in the MCML header, because the entire packet 509 was transmitted in one link layer packet 510. The class information is for example 3 and the sequence number is advantageously the first one in the sequence number series of class 3, in this example the number 0.

After the transmission of the audio packet 509, it is possible to resume the suspended lower priority transmission, in this case the transmission of the video packet 505. First, the header information of the link layer protocol is transmitted, and after that the transmission of the video packet 505 is continued until the entire packet is transmitted, or until a higher priority packet is set to be transmitted. In the example of FIG. 5, the terminal part of the video packet 505 is transmitted in one fragment 511, after which the MCML header data is transmitted. Now the E-flag is set, and the sequence number is advantageously one unit larger (1) than that the sequence number of the previous link layer packet 506 which transmitted the video packet 505.

Correspondingly, the suspended transmission of the lower priority packet 502 is resumed at that stage when there are no higher priority packets to be transmitted.

In a way known as such, the receiving terminal examines the header information of the packets in order to find out which data transmission flow the packet belongs to. After that, the actual data is received and transferred to a receiving buffer (not shown). The receiving terminal MS also advantageously contains at least one receiving buffer for each class. On the basis of the MCML header information, the receiving terminal can deduce whether the received packet was the first, the last, or some other fragment of the network layer packet. Furthermore, on the basis of the sequence number, the fragments can be arranged in the correct order also when they are not received in the transmission order. By means of the checksum, the receiving terminal can also examine whether errors have appeared in the content or header information of the packet during the transmission.

In the terminal, the received fragments are formed into packets according to the network layer protocol used in the data transmission, which packets are further transmitted to be used by the corresponding application of the application layer.

In order to transfer packets in a physical data transmission channel, it is necessary to perform channel coding for the packets in the transmitting terminal. Correspondingly, in the receiving communication device, the signals received from the data transmission channel are channel decoded in order to reconstruct a packet which corresponds to the link layer packet as accurately as possible. These channel coding and channel decoding stages are prior art known as such, and their details depend on the application in question, as well as on the data transmission channel, and therefore it is not necessary to discuss them in detail in this context.

The above-presented preferred embodiment of the invention utilized in all data transmission flows the simpler (more unreliable) data transmission mode of the link layer: the non-numbered mode of the PPP protocol. The invention can also be applied in such a way that the numbered mode is used in such data transmission flows which require a low error probability rate. In such data transmission flows, where a small number of errors is not as important as the real time quality of the data transmission, the non-numbered mode will be used. Thus, in the header information it is possible to set the values of the header field and the control field into the default values of the PPP protocol standard which indicate that the transmission in question is non-numbered. Correspondingly, for example in the transmission of real-time data, the address and control fields are provided with information known as such according to the numbered mode. In the numbered mode, the control field is advantageously used to transmit the sequence numbering information of the frames as well. The receiving terminal is thus capable of deducing the data transmission mode in question at a given time. The method according to this embodiment enables the transfer of several simultaneous data transmission flows which, however, have different transmission requirements, in point-to-point connections, especially in data transmission networks with a high bit error rate (BER). For example in the GSM mobile communication network, it is thus possible to use the transparent mode of a high-speed circuit-switched connection both for real-time applications and for applications requiring low error rate.

In an acknowledgement message of a packet received incorrectly in the numbered mode of the PPP protocol, the receiving terminal transmits a message indicating the sequence number of the packet in the control field. The transmitting communication device retransmits the packet by using the same sequence number in the control field as in the packet received incorrectly. If a higher priority message is set to be next in the transmission order in connection with the retransmission, the retransmission is interrupted and an MCML header byte, a checksum and a flag of the frame are transmitted. After resuming the interrupted transmission, the next sequence number is advantageously used in the MCML header field, but the same sequence number remains in the control field.

The invention is not restricted solely to the above-presented embodiments, but it can be modified within the scope of the appended claims.

What is claimed is:

1. Method for transferring information in data transmission flows between a first (MS) and a second communication device (SH), said method comprising the steps of:
    establishing at least one data transmission connection between the first (MS) and the second communication device;
    dividing the data transmission into at least an application layer (AL), a network layer (NL), and a link layer (LL), wherein packets (502, 505, 508) of the data transmission flow formed in the application layer from the information to be transferred, are modified into network layer packets (509) according to the network layer protocol, and transmitted by means of one or more data transmission channels in link layer (LL) packets (506, 510), in which an information part is established to transfer the information to be transmitted, as well as at least a first (504) and a second header part (MCML) to transmit identification data on the data transmission flow; and
    characterized in that the length of the link layer packet is determined dynamically, thereby enabling the packet to be transmitted as a whole in one link layer packet, if no higher priority packets are set to be transmitted and at least the second header part (MCML) is transmitted after the information part.

2. The method according to claim 1, further comprising the steps of:
    defining a priority, indicating the order of urgency for the data transmission flows;
    characterized in that the method further comprises at least the following steps, when said link layer packet (506, 510) of the data transmission flow is set to be transmitted:
    examining whether the transmission of packets of another data transmission flow is in progress; and
    if the transmission of packets of another data transmission flow is not in progress, the transmission of said packet of the data transmission flow is initiated,
    if the packet transmission of another data transmission flow is in progress, it is examined which data transmission has the highest priority determined,
    if the packet of the data transmission flow which is to be transmitted is higher in priority than the data transmission flow which is being transmitted, the transmission of the packet of the lower priority data transmission flow is suspended, said suspension further comprising the steps of:
        transmitting the second header part (MCML) of the packet to be transmitted in the suspended data transmission flow;
        calculating a checksum (FCS) from the transmitted packet;
        transmitting the checksum (FCS); and
        transmitting a flag of the packet.

3. The method according to claim 2, in which the network layer packets are transmitted in one or more link layer packets, characterized in that beginning information (B) of the packet is set in the second header part (MCML), if the first part of the network layer packet was transmitted in the suspended link layer packet, and that the end information (E) of the packet is set in the second header part (MCML) if the last part of the network packet was transmitted in the suspended link layer packet.

4. The method according to claim 3, characterized in that the second header part is also provided with the sequence number (seqno) of the packet.

5. The method according to claim 1, characterized in that at least one network layer protocol, and at least one link layer protocol, is used in the method.

6. The method according to claim 1, characterized in that the data transmission connection is set up as a point-to-point connection.

7. The method according to claim 1, in which the packets of the first data transmission flow are used to transfer information requiring substantially real-time data transmission, and the packets of the second data transmission flow are used to transfer non-real time information, and in which the protocol used in the link layer comprises a numbered mode and an unnumbered mode, characterized in that the unnumbered mode is used in the transmission of packets of the first data transmission flow, and that the numbered mode is used in the transmission of packets of the second data transmission flow.

8. A communication system having means for transferring information in data transmission flows between a first (MS) and a second communication device (SH), and having means for setting up at least one data transmission connection between the first (MS) and the second communication device (SH), which data transmission is divided into at least an application layer (AL), a network layer (NL) and a link layer (LL), said system comprising:
    means for modifying the data transmission flow packets (502, 505, 508) formed in the application layer from the information to be transferred, into network layer packets (509) according to the network layer protocol,
    means for transmitting the network layer packets (509) via one or more data transmission channels in link layer (LL) packets (506, 510) having an information part for transferring the information to be transmitted and at least a first (504) and a second header part (MCML) for transmitting identification information on the data transmission flow;
    characterized in that the length of the link layer packet is determined dynamically, thereby enabling the packet to be transmitted as a whole in one link layer packet, if no higher priority packets are set to be transmitted and at least the second header part (MCML) is arranged to be transmitted after the information part.

9. A communication system, according to claim 8, further comprising:
    means for defining a priority, indicating the order of urgency for the data transmission flows;
    characterized in that said means for defining priority further comprises:
    means for examining whether the transmission of packets of another data transmission flow is in progress, when said link layer packet (506, 510) of the data transmission flow is set to be transmitted; and
        wherein if the transmission of packets of another data transmission flow is not in progress, the transmission of said packet of the data transmission flow is initiated,
        if the packet transmission of another data transmission flow is in progress, it is examined which data transmission has the highest priority determined,
        if the packet of the data transmission flow which is to be transmitted is higher in priority than the data transmission flow which is being transmitted, the transmission of the packet of the lower priority data transmission flow is suspended;

said means for defining priority further comprising:
  means for transmitting the second header part (MCML) of the packet to be transmitted in the suspended data transmission flow;
  means for calculating a checksum (FCS) from the transmitted packet;
  means for transmitting the checksum (FCS); and
  means for transmitting a flag of the packet.

10. The communication system according to claim 9, in which the network layer packets are arranged to be transmitted in one or more link layer packets, characterized in that beginning information (B) of the packet is set in the second header part (MCML), if the first part of the network layer packet was transmitted in the suspended link layer packet, and that the end information of the packet is set in the second header part (MCML) if the last part of the network layer packet was transmitted in the suspended link layer packet.

11. The communication system according to claim 10, characterized in that the communication system also comprises means for setting the sequence number (seqno) of the packet into the second header part.

12. The communication system according to claim 8, 10, or 11, characterized in that it comprises means for setting up the data transmission connection as a point-to-point connection.

13. A wireless communication device (MS) having means for transferring information in data transmission flows in a communication system, and having means for establishing at least one data transmission connection between the wireless communication device (MS) and a second communication device (SH), which data transmission is divided into at least an application layer (AL), a network layer (NL) and a link layer (LL) said system comprising:

means for modifying the data transmission flow packets (502, 505, 508) formed in the application layer from the information to be transferred, into network layer packets (509) according to the network layer protocol, and means for transmitting the network layer packets (509) via one or more data transmission channels in link layer (LL) packets (506, 510) having an information part for transferring the information to be transmitted and at least a first (504) and a second header part (MCML) for transmitting identification information on the data transmission flow; and characterized in that the length of the link layer packet is determined dynamically, thereby enabling the packet to be transmitted as a whole in one link layer packet, if no higher priority packets are set to be transmitted and the second header part (MCML) is transmitted after the information part.

\* \* \* \* \*